UNITED STATES PATENT OFFICE.

GEORGE DEFREN, OF NEWTON, MASSACHUSETTS.

PROCESS OF PREPARING BEVERAGES.

1,235,881.

Specification of Letters Patent.

Patented Aug. 7, 1917.

No Drawing.

Application filed March 27, 1917. Serial No. 157,770.

*To all whom it may concern:*

Be it known that I, GEORGE DEFREN, a citizen of the United States, and a resident of Newton, in the county of Middlesex and State of Massachusetts, have invented an Improvement in Processes of Preparing Beverages, of which the following description is a specification.

This invention relates to a process of preparing beverages, particularly as a substitute for malt beverages as heretofore produced. In certain of its aspects the present invention may be considered an improvement of the process described in my Patent 1,214,518, Feb. 6, 1917.

In the patent referred to I have described a process of producing a beverage of the character of beer or ale, by means of the following steps:—Mixing with acidulated water a sufficient quantity of material containing starch and protein to supply in full the desired constituents of the product; heating the same to produce by the reaction which is commonly known as acid hydrolysis fermentable sugars in quantities equivalent to that obtained for the desired beverage by ordinary malt conversion; checking conversion of the material, leaving the product somewhat acid whereby to hold protein in solution; separating the liquid portion; caramelizing a part thereof and returning the same to the bulk; fining; boiling the product with hops and fermenting with yeast. For a fuller and more detailed description of the process together with many examples, I refer to the specification of that patent.

I have been able considerably to simplify the process described by adding the hops to the mixture of starch and protein containing material and acidulated water prior to the heating thereof to effect hydrolysis. The mixed hops, (preferably disintegrated) and starch and protein containing material, suspended in the acidulated water, are then subjected to the action of heat at an elevated temperature as explained in my patent above referred to. The process can, if desired, be continued thereafter as there described, omitting, of course, the boiling with hops, since the above procedure gives the liquid the usual hop odor and flavor and eliminates the step of boiling the acid converted substance with hops in the kettle and the removal of the spent hops and coagulated protein in the manner analogous to that at present in use in the production of malt beverages. The elimination of this boiling is an obvious economy as is also the elimination of handling to remove solid material. In the ordinary process hitherto used and involving the use of malt, similar elimination of this step is impossible because the material can not be hopped prior to the enzymic action of the malt for the reason that the hops are necessary to coagulate malt protein and to act as a filtering surface for the wort.

The acid converted product, whether or not treated with hops during the conversion process, contains soluble carbohydrates in the form of fermentable sugars and also more or less soluble nitrogenous substances, the nature of which is as yet obscure, formed by the proteolysis of some of the proteids. The liquid or liquor resulting is maintained somewhat acid in order to keep in solution these nitrogenous substances. The required acidity corresponds to a concentration of hydrogen ions analogous to that of about one tenth to two tenths of one per cent. of lactic acid in water solution. By utilizing for conversion a strength of acid only slightly in excess of this, varying the temperature maintained and the time of treatment as may be necessary, the partial neutralization of the liquor may be avoided. A small percentage of the acid used in the conversion enters into combination with some of the nitrogenous substances and is thus eliminated from activity.

In order to increase the amount of soluble protein matter whereby to furnish more nutriment for the yeast and thus promote the fermentability of the product and also in order to increase the foam keeping capacity, full bodied taste and viscosity of the resulting beverage, I may treat the unclarified liquor before fermentation with a suitable proteolytic enzym. Suitable enzyms for this purpose are pepsin, papain, bromelin, peptase or the proteolytic enzym obtained from plasmolyzed or ruptured yeast cells. From one to ten grams of enzym may be employed for each barrel of 31 gallons. The temperature of the liquid is reduced to about 40° to 65° centigrade, the enzym is added and the temperature is maintained for a suitable length of time, say from 15 minutes to 1 hour. The longer the time and the greater the amount of the proteolytic enzym utilized the more soluble nitrogenous substances will be formed.

After the liquor has been treated as described, a large percentage of any insoluble protein or undissolved hop matter remaining after the action of the enzym may be removed by suitable mechanical devices, such as a centrifuge or a filter, or by fining with a soluble salt of casein. The refined liquor is then ready for fermentation with yeast in the ordinary manner.

I am aware that proteolytic enzyms have been used to stabilize malt beverages, but these were added to malt worts after fermentation or to the finished beers made from malt to relieve them from turbidity caused by the presence of albuminous matters. In my process I add the enzym prior to any fermentation by yeast, the object being to produce a larger quantity of soluble protein than is produced by the action of acid alone on the starch and protein containing material. The resulting beverage remains clear to the eye after bottling, with or without pasteurization and whether or not subjected to the action of cold, for example, by being placed on ice. At the same time the amount of the extract in the beverage is increased and it has better foam keeping capacity and more full bodied taste. Apparently the proteolytic enzym will remain unchanged in the finished fermented beverage.

Having thus described a desirable manner of carrying out my invention by the way of an example, what I claim as new and desire to secure by Letters Patent is:—

1. The process of preparing beverages of the character of beer or ale comprising the following steps:—mixing with acidulated water material containing starch and protein and hops heating the same to produce the required amount of fermentable sugars and at the same time hopping the mixture, checking conversion of the material, leaving the product acid whereby to hold protein in solution and fermenting the liquid portion.

2. That step in the process of preparing beverages consisting of converting material containing starch and protein by the action of heat and acid in the presence of hops.

3. The process of preparing beverages of the character of beer or ale comprising the following steps:—converting material containing starch and protein by the action of an acid, treating the product with a suitable proteolytic enzym to produce soluble nitrogenous substances, maintaining acidity therein, separating the liquor and fermenting the same with yeast.

4. The process of preparing alcoholic beverages of the character of beer or ale comprising the following steps: mixing with acidulated water a sufficient quantity of material containing starch and protein to supply in full the desired constituents of the product, heating the same to produce fermentable sugars in quantity equivalent to that obtained for the desired beverage by ordinary malt conversion, checking conversion of the material, leaving the product somewhat acid whereby to hold protein in solution, treating at a moderate temperature as described with proteolytic enzym to produce soluble nitrogenous substances, and fermenting the liquor with yeast.

5. The process of preparing alcoholic beverages of the character of beer and ale comprising the following steps:—mixing with acidulated water hops and material containing starch and protein, the whole in quantity sufficient to supply in full the desired constituents of the product, heating the same to produce fermentable sugars in quantity equivalent to that obtained for the desired beverage by ordinary malt conversion, checking conversion of the material, leaving the product somewhat acid whereby to hold protein in solution, treating at a moderate temperature as described with proteolytic enzym to produce soluble nitrogenous substances, and fermenting the liquor with yeast.

In testimony whereof, I have signed my name to this specification.

GEORGE DEFREN.